(12) United States Patent
Yoshida et al.

(10) Patent No.: US 7,992,412 B2
(45) Date of Patent: Aug. 9, 2011

(54) PROCESS FOR PRODUCING GLASS SHAPED MATERIAL AND PROCESS FOR PRODUCING OPTICAL ELEMENT

(75) Inventors: Masahiro Yoshida, Saitama (JP); Yoshikane Shinkuma, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 1879 days.

(21) Appl. No.: 10/873,620

(22) Filed: Jun. 23, 2004

(65) Prior Publication Data
US 2004/0261454 A1 Dec. 30, 2004

(30) Foreign Application Priority Data

Jun. 27, 2003 (JP) ................................. 2003-185048
Jun. 27, 2003 (JP) ................................. 2003-185071

(51) Int. Cl.
C03B 7/10 (2006.01)
(52) U.S. Cl. ................ 65/133; 65/123; 65/126; 65/127; 65/63; 65/102
(58) Field of Classification Search .................... None
See application file for complete search history.

(56) References Cited

U.S. PATENT DOCUMENTS
1,552,497 A * 9/1925 Noble .............................. 65/122
6,844,279 B2 1/2005 Hayashi et al.
2002/0062660 A1 * 5/2002 Yoshikuni et al. ............. 65/25.1
2005/0113240 A1 5/2005 Hayashi et al.

FOREIGN PATENT DOCUMENTS
| JP | 2-34525 A | 2/1990 |
| JP | 7-51446 B | 6/1995 |
| JP | 10-338530 | 12/1998 |
| JP | 2000-7360 | 1/2000 |
| JP | 2002-249337 | 9/2002 |

* cited by examiner

*Primary Examiner* — Richard Crispino
*Assistant Examiner* — Michael J Felton
(74) *Attorney, Agent, or Firm* — Nixon & Vanderhye P.C.

(57) ABSTRACT

Disclosed are a process for producing a glass shaped material having high quality and high mass accuracy and a process for producing an optical element, which includes the preparation of a glass shaped material having high quality and high mass accuracy, the heating of said glass shaped material and the precision-press-molding thereof.

The present invention provides a process for producing a glass shaped material including the separation of a predetermined amount of a molten glass gob from the forward end of a molten glass flow flowing down from a flow pipe, by a specific means and the shaping thereof into the glass shaped material, a process for producing a glass shaped material including the dropping of a molten glass drop from a flow pipe, the receipt thereof with a shaping mold that ejects a gas, by a specific means, and the shaping thereof into the glass shaped material while it is caused to float, and a process for producing an optical element including the precision press-molding of a preform obtained by one of these processes.

15 Claims, 4 Drawing Sheets

PROCESS FOR PRODUCING GLASS SHAPED MATERIAL AND PROCESS FOR PRODUCING OPTICAL ELEMENT

This application claims priority to JP Application No. 2003-185048, filed 27 Jun. 2003 and JP Application No. 2003-185071, filed 27 Jun. 2003. The entire contents of this application is incorporated herein by reference.

BACKGROUND OF THE INVENTION

1. Field of the Invention

The present invention relates to a process for producing a glass shaped material such as a preform having high mass accuracy for precision press-molding directly from a molten glass, and a process for producing an optical element by precision-press-molding a preform prepared by the above process.

2. Related Art Statement

As a method of shaping a preform to which precision press-molding is applied, conventionally, there is employed, for example, (1) a method in which a forward end of a molten glass flow that is flowing out of a flow pipe is received with a shaping mold, the shaping mold is moved downwardly to separate a glass having a predetermined mass without a cutting blade and the glass is shaped into a preform to which the precision press-molding is to be applied (JP-A-2-34525), or (2) a method in which a molten glass that is flowing out of a flow pipe is received with a shaping mold and a received glass is shaped into a preform for precision press-molding while the glass is allowed to float above the shaping mold by applying gas pressure (JP-B-7-51446). These methods are remarkably excellent as a method for producing high-quality preforms.

In conventional precision press-molding, generally, an optical-function surface such as a lens surface is molded (formed) by precision press-molding and a non-optical-function surface is formed by grinding and polishing. In recent years, there are increasing demands for a technique that can be applied to the molding (forming) of the non-optical-function surface of an end product by precision press-molding as well. When the above demands are to be accepted, it is required to bring the volume of a preform into precise agreement with the volume of an optical element to be produced by precision press-molding, i.e., to improve the mass accuracy of the preform. For the above reason, and the like, preforms for precision press-molding are required to have high mass accuracy.

Meanwhile, in the above method (1), a plurality of shaping molds are provided and consecutively carried into a position below a flow pipe and molten glasses are consecutively received and shaped. In this case, it is required to keep the flow of a molten glass at a constant rate and precisely control the timing of separating a molten glass gob equivalent to the mass of one preform from the molten glass flow. For this purpose, it is required to operate every shaping mold in a like manner during the operation from receipt of a forward end of a molten glass to completion of the separation of a molten glass gob. Specifically, it is required to control a change in position and a change in height so that these changes are at very low levels over the time period of operation with regard to each of many shaping molds, and it is hence very difficult to adjust an apparatus.

In the above method (2) and when shaping is carried out by providing a plurality of shaping molds, carrying them consecutively into a position below a flow pipe and allowing the shaping molds, one after another, to receive molten glass, gas that is ejected upwardly for floating a glass in a shaping mold is blown to the flow pipe. Particularly, when a molten glass drop drops down toward the center of a shaping mold, a gas ejection port comes to be positioned right below the flow pipe, so that the gas directly hits the flow pipe. In this state, the temperature of the flow pipe varies, or the behavior of a molten glass drop to drop downward is destabilized, so that there is caused a problem that it is difficult to obtain a glass shaped material having high mass accuracy.

SUMMARY OF THE INVENTION

Under the circumstances, it is an object of the present invention to provide a process for producing a glass shaped material having high quality and high mass accuracy, and a process for producing an optical element, which comprises preparing a glass shaped material having high quality and high mass accuracy, heating the glass shaped material and precision-press-molding the same.

For achieving the above object, the present inventor has made diligent studies and, as a result, found that the object of the present invention can be achieved as follows. Molten glass gobs are not separated with the shaping molds, the molten glass gob separating function is divided from each shaping mold and provided to a support, and a gas blown out of the shaping mold is blocked by means of the support, so that the gas does not hit the forward end of the flow pipe. Further, it has been found that the above object can be achieved by shielding the flow pipe from a gas ejected from a shaping mold without preventing the dropping of a molten glass drop. The present invention has been accordingly completed on the basis of the above finding.

That is, the present invention provides;

(1) a process for producing a glass shaped material by separating a predetermined amount of a molten glass gob from the forward end of a molten glass flow flowing downwardly from a flow pipe and shaping the molten glass gob into the glass shaped material, the process comprising receiving the forward end of a molten glass flow with a molten glass support arranged below the flow pipe to support the forward end directly, causing said molten glass support to move perpendicularly down to separate a predetermined amount of a molten glass gob from the forward end of the molten glass flow, receiving the molten glass gob that is caused to drop perpendicularly down by removing said support, with a shaping mold, and shaping the molten glass gob into the glass shaped material (to be referred to as "process 1 for producing a glass shaped material" hereinafter), (2) a process for producing a glass shaped material as recited in the above (1), wherein said molten glass gob is separated at a constant time interval from the molten glass flow continuously flowing downwardly at a constant flow rate with the molten glass support, and thus-separated molten glass gobs are consecutively distributed to a plurality of shaping molds, (3) a process for producing a glass shaped material as recited in the above (1), wherein the molten glass support is constituted of a plurality of split members that can be spaced from, and attached tightly to, each other, the forward end of the molten glass flow is received with a boundary portion formed by tight attachment of said split members in a state where said split members are tightly attached to each other, to support the forward end, and said split members are spaced from each other to cause the molten glass gob to drop perpendicularly down, (4) a process for producing a glass shaped material as recited in the above (3), wherein immediately after the glass gob is caused to drop perpendicularly down, the split members are attached tightly to each other, and the molten glass gob is shaped into the glass shaped material while gas pressure is applied to the molten glass gob on the shaping mold, (5) a process for producing a glass shaped material as recited in the above (1), wherein the molten glass gob is caused to drop down on the center of the shaping mold, (6) a process for producing a glass shaped material as recited in the above (1), wherein the molten glass gob is separated and the glass shaped material is shaped while the molten glass support is cooled, (7) a process for producing a glass shaped material as recited in the above (1), wherein the molten glass flow has a viscosity of 0.5 to 50 dPa·s and is caused to flow downward, (8) a process for producing a glass shaped material as recited in the above (1), wherein the process uses one of a phosphate glass containing $Nb_2O_5$, a phosphate glass containing $TiO_2$, a phosphate glass containing BaO, a phosphate glass containing $Li_2O$, a phosphate glass containing $Na_2O$, a phosphate glass containing $K_2O$, a glass containing $B_2O_3$ and $La_2O_3$, a glass containing $B_2O_3$, $La_2O_3$ and $WO_3$, a glass containing $B_2O_3$, $SiO_2$ and BaO, a glass containing $B_2O_3$, $SiO_2$, $TiO_2$ and $WO_3$, a glass containing $SiO_2$, an alkali metal oxide and fluorine, a fluorophosphate glass containing an alkali metal oxide and an alkaline earth metal oxide and a fluorophosphate glass containing an alkali metal oxide and ZnO, (9) a process for producing a glass shaped material as recited in the above (1), wherein the glass shaped material is a preform for precision press-molding,

(10) a process for producing an optical element comprising the steps of heating a preform made of a glass to soften the preform and precision press-molding the preform, wherein the preform is prepared by the process recited in the above (9) (to be referred to as "process 1 for producing an optical element" hereinafter),

(11) a process for producing an optical element as recited in the above (10), wherein all of surfaces of the optical element are formed by precision press-molding,

(12) a process for producing an optical element as recited in the above (10), wherein the preform is introduced into a press mold, the press mold and said preform are together heated and the preform is precision-press-molded,

(13) a process for producing an optical element as recited in the above (10), wherein the preform is pre-heated to a temperature higher than the temperature of the press mold and introduced into the press mold to carry out the precision press-molding,

(14) a process for producing a glass shaped material, which comprises causing a molten glass drop to drop down from a flow pipe, receiving the molten glass drop with a shaping mold which is ejecting a gas, and shaping the molten glass drop into the glass shaped material while the molten glass drop is caused to float, wherein a blocker is provided so as to cross the dropping course of the molten glass drop for shielding the flow pipe from the gas ejected from said shaping mold, and said blocker is removed from said dropping course synchronously with the dropping of the molten glass drop (to be referred to as "process 2 for producing a glass shaped material" hereinafter),

(15) a process for producing a glass shaped material as recited in the above (14), wherein the blocker is constituted of a plurality of split members, and said split members are arranged in a manner in which they are attached tightly to each other to shield the flow pipe from the gas ejected and they are spaced from each other synchronously with the dropping of said molten glass drop to cause the molten glass drop to drop through between the spaced split members,

(16) a process for producing a glass shaped material, which comprises causing a molten glass drop to drop down from a flow pipe, receiving the molten glass drop with a shaping mold which is ejecting a gas, and shaping the molten glass drop into the glass shaped material while the molten glass drop is caused to float, wherein a support is provided so as to cross the dropping course of the molten glass drop for shielding the flow pipe from the gas ejected from said shaping mold, the molten glass drop that is caused to drop down is received directly with the support, and then the molten glass gob that is caused to drop perpendicularly down by removing said support is received with a shaping mold, and the molten glass gob is shaped into the glass shaped material (to be referred to as "process 3 for producing a glass shaped material" hereinafter),

(17) A process for producing a glass shaped material as recited in the above (16), wherein the support is constituted of a plurality of split members, and said split members are arranged in a manner in which they are attached tightly to each other to shield the flow pipe from the gas ejected, the molten glass drop caused to drop down is received directly on a position formed by tight attachment of said split members, and then, they are spaced from each other to cause the molten glass drop to drop through between the spaced split members,

(18) A process for producing a glass shaped material as recited in the above (14) or (16), wherein the molten glass drop is caused to drop toward that shaping portion of the shaping mold which is provided with a gas ejection port,

(19) A process for producing a glass shaped material as recited in the above (14) or (16), wherein the process uses one of a phosphate glass containing $Nb_2O_5$, a phosphate glass containing $TiO_2$, a phosphate glass containing BaO, a phosphate glass containing $Li_2O$, a phosphate glass containing $Na_2O$, a phosphate glass containing $K_2O$, a glass containing $B_2O_3$ and $La_2O_3$, a glass containing $B_2O_3$, $La_2O_3$ and $WO_3$, a glass containing $B_2O_3$, $SiO_2$ and BaO, a glass containing $B_2O_3$, $SiO_2$, $TiO_2$ and $WO_3$, a glass containing $SiO_2$, an alkali metal oxide and fluorine, a fluorophosphate glass containing an alkali metal oxide and an alkaline earth metal oxide and a fluorophosphate glass containing an alkali metal oxide and ZnO,

(20) a process for producing a glass shaped material as recited in the above (14) or (16), wherein the molten glass has a viscosity of 0.5 to 50 dPa·s and is caused to flow downward and drop down,

(21) a process for producing a glass shaped material as recited in the above (14) or (16), wherein the glass shaped material is a preform for precision press-molding,

(22) a process for producing an optical element comprising the steps of heating a preform made of a glass to soften the preform and precision press-molding the preform, wherein the preform is prepared by the process recited in the above (21) (to be referred to as "process 2 for producing an optical element" hereinafter),

(23) a process for producing an optical element as recited in the above (22), wherein all of surfaces of the optical element are formed by precision press-molding,

(24) a process for producing an optical element as recited in the above (22), wherein the preform is introduced into a press mold, the press mold and said preform are together heated and the preform is precision-press-molded, and

(25) a process for producing an optical element as recited in the above (22), wherein the preform is pre-heated to a temperature higher than the temperature of the press mold and introduced into the press mold to carry out the precision press-molding.

PREFERRED EMBODIMENTS OF THE INVENTION

Figure 1:
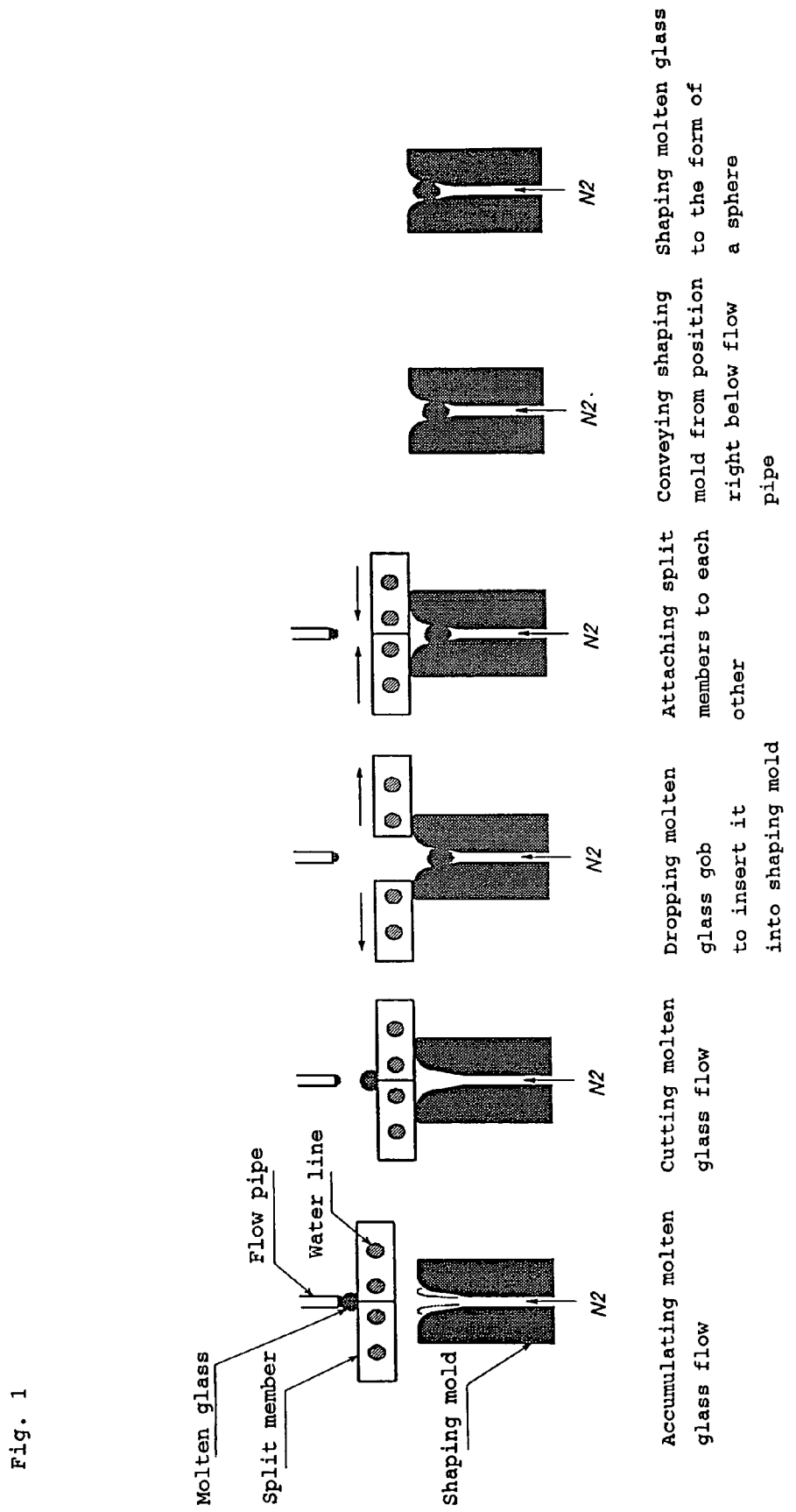
FIG. 1 shows drawings for explaining the steps of producing preforms for precision press-molding in Example 1.

First, embodiments of the process 1 for producing a glass shaped material, provided by the present invention, will be explained.

First, a clarified and homogenized molten glass is prepared, and the molten glass is caused to continuously flow down at a constant flow rate from a temperature-controlled flow pipe made, for example, of a platinum alloy. The forward end of the molten glass flow flowing downwardly is supported directly on the upper surface of a molten glass support that is in a standby state below the flow pipe. That is, the above supporting is performed in a state where the forward end of the molten glass flow and the molten glass support are in contact with each other. Preferably, the molten glass support is constituted of a plurality of split members, and the split members work to attach themselves tightly to each other and separate themselves from each other. When the forward end of the molten glass flow is received, the split members are attached tightly to each other, and the forward end of the molten glass flow is preferably received and supported on a boundary portion of the split members. In this state, the above support and the forward end of the molten glass flow are in direct contact with each other, so that the viscosity of the forward end of the molten glass flow increases even if the molten glass has a low viscosity, and no glass penetrates a contact portion of the split members. Further, since the viscosity of a molten glass gob increases due to its contact to the split members, there can be effectively prevented the folding of a glass into itself, which folding is liable to take place when the molten glass gob is transferred to a shaping mold as will be explained below. Preferably, the split members are cooled for preventing the fusion thereof to the molten glass and making it easier to produce the above effect. The method of the above cooling includes, for example, a method of cooling the split members with water, a method of air-cooling the split members, a method of increasing the emissivity by coloring the split member surfaces in black and a method using a combination of two or more of the above methods. For cooling the split members with water or air, insides of the split members can be provided with flow lines, and cooling water or cooling gas can be allowed to flow through the lines. The material for the molten glass support includes, for example, a refractory metal, carbon and ceramic. When heat resistance and thermal conductivity are taken into account, a refractory stainless steel is preferred.

After the forward end of the molten glass flow is received and supported, the molten glass support is moved perpendicularly down to separate a predetermined amount of a molten glass gob. For attaining a constant amount of each molten glass gob, the conditions of the position where the forward end of the molten glass flow is received and the downward movement of the molten glass support should be constant, and the cycle of the downward movement should be also constant. Desirably, the speed of the above downward movement is greater than the flowing speed of the molten glass flow. When the molten glass support is moved perpendicularly down, a narrow portion is formed between the forward end and the flow pipe side of the molten glass flow, and as the downward movement is further continued, the narrow portion becomes narrower. And, the forward end is separated to give a predetermined amount of a molten glass gob on the molten glass support. Then, the split members are spaced from each other to cause the molten glass gob to drop perpendicularly down through between the spaced split members.

Before completion of the separation from the glass flow, the split members may be spaced from each other to cause the molten glass gob to drop down. However, a glass having a large viscosity has a greater cutting speed, so that a stringiness may occur in a cutting portion.

The number of the split members is not critical, and it may be any number. From the viewpoint of reliable and easy operation of the above series of procedures, preferably, the molten glass support is constituted of two split members. In this case, the boundary of the split members in a state where the split members are attached tightly to each other is preferably formed in a straight line for attaching the two members tightly to each other. Desirably, the two split members have flat upper surfaces, the above two upper surfaces form an angle of 90° to 180°, and the two upper surfaces are symmetrical to each other with regard to an imaginary plane passing the boundary of the two split members. When the above molten glass support is employed, the forward end of the molten glass flow can be stably supported, and the molten glass gob can be caused to drop perpendicularly down upon spacing of the split members.

Before the above moving of the molten glass support, the molten glass support may be moved perpendicularly downward at a speed lower than the flowing speed of the molten glass flow. By this operation, there can be prevented the occurrence of a stria that is caused by embedding of the forward end of the flow pipe in an accumulated molten glass.

Below the molten glass support, a shaping mold is in a standby position and receives a molten glass gob that drops in free fall. The molten glass flows out of the flow pipe and constantly passes along a perpendicularly downward course until it drops on the shaping mold. Therefore, horizontal components of external force working on the molten glass gob can be minimized, and the occurrence of defects such as the folding of a glass into itself in a glass shaped material, and the like can be prevented.

The bottom of the shaping mold for receiving the molten glass gob and shaping it into a glass shaped material is provided with a gas ejection port. And, while a gas for causing a glass (which generally refers to both a molten glass gob and a glass shaped material) on the shaping mold to float by upward application of gas pressure is ejected therefrom, the glass is shaped into a glass shaped material. When the above gas (to be referred to as "floating gas" hereinafter) is blown to the flow pipe, the temperature of the pipe or the molten glass flow flowing downward may be decreased, or the downward flowing of the molten glass flow may be destabilized. Preferably, therefore, immediately after the molten glass gob is caused to drop down, the split members are attached tightly to each other to block the floating gas. The floating gas includes, for example, air, an inert gas, a carbon dioxide gas, and the like.

The gas ejection port may be formed of a plurality of small holes that are selectively open or one small hole. A method in which the gas is ejected from a plurality of selectively opened small holes is suitable for shaping the glass into a glass shaped material having a body of revolution which has one revolution symmetrical axis and where the outline of a cross section including the above revolution symmetrical axis has an outwardly convex form, since an upward air (gas) pressure is broadly applied to molten glass gob. In this case, preferably, a plurality of the small holes are arranged in the cavity portion of the shaping mold so that they are symmetrically positioned with regard to the center of the cavity portion.

On the other hand, when the gas is ejected from one small hole provided in the center of the cavity portion of the shaping mold, the glass can be shaped into a glass shaped material while the glass is whirled inside the cavity of the shaping mold. This method is suitable for shaping the glass into a spherical glass shaped material.

The material for the shaping mold can be selected from a refractory metal such as stainless steel, carbon, or the like. Further, while the molten glass gob transferred to the shaping mold has a temperature lower than the temperature of the glass that flows out, the molten glass gob still has a high temperature and may be fused to the shaping mold. It is therefore preferred to control the temperature of the shaping mold so that the shaping mold has a temperature of 300° C. or lower, for reliably preventing the above fusion. For preventing the fusion, further, it is desirable to provide a film such as a diamond-like carbon film to that surface of the shaping mold which comes in contact with the molten glass gob.

It is also desirable to provide a film such as a diamond-like carbon film to that surface of the molten glass support which comes in contact with the molten glass, for preventing its fusion to the molten glass. Further, the above surface is preferably finished so as to be a mirror surface. When the split members of the molten glass support are spaced from each other to drop the molten glass gob, and when the glass is fused to the split member surfaces or when the molten glass does not easily slide, horizontal components of an external force exerting on the molten glass gob is large, and there is an increasing possibility that defects such as the folding of a glass into itself, etc., may take place in the glass shaped material. For preventing the fusion and improving the slipperiness, particularly preferably, the split member surfaces are coated with a diamond-like carbon, the split members are cooled, and the split member surfaces are polished.

Further, for more reliably preventing the folding of the glass into itself, preferably, the molten glass gob is caused to drop down in the center of the shaping mold, and the above means are important points for this purpose.

For receiving molten glass gobs that are consecutively separated and caused to drop down, a plurality of shaping molds are consecutively conveyed to a position below the molten glass support. Specifically, there may be employed, for example, a constitution in which a plurality of the shaping molds are arranged at regular intervals on a turn table and one empty shaping mold stays in a standby (receiving) position when one molten glass gob is caused to drop down. In this manner, the molten glass gobs are distributed to a plurality of the shaping molds and shaped into glass shaped materials.

Thus-formed glass shaped materials on the shaping molds are cooled to a temperature at which they are not deformed by an external force, and they are taken out and gradually cooled.

The above process is also suitable for shaping a glass having a low flow-viscosity so that it is liable to cause the folding of glass into itself, and in the above process, high-quality glass shaped materials having high mass accuracy can be shaped from a molten glass having a viscosity of 0.5 to 50 dPa·s when it flows down.

Examples of the form of the thus-obtained glass shaped material include the form of a sphere and the form of a body of revolution which has one revolution symmetrical axis and where the outline of a cross section including the above revolution symmetrical axis has an outwardly convex form.

Further, when a glass shaped material made of an optical glass is produced, there can be also prepared a preform for producing a ball lens or an optical element by precision press-molding.

Glass materials suitable for the above glass shaped material will be explained below. As is already explained, the above process is suitable for a glass having a viscosity in the range of 0.5 to 50 dPa·s during its flowing time. For preventing the devitrification of the glass during the flowing time and the shaping time, it is essential to adjust the temperature of the molten glass to a temperature higher than the liquidus temperature of the glass. When the glass shaped material itself is used as an optical element or when the glass shaped material is used as a preform for precision press-molding to produce an optical element therefrom by precision press-molding, there is demanded a glass material having a constant dispersion and having a higher refractive index than a conventional one. Most of such glasses have a viscosity in the range of 0.5 to 50 dPa·s during their flowing time for preventing their devitrification. Examples of such optical glasses include a phosphate glass containing $Nb_2O_5$, a phosphate glass containing $TiO_2$, a phosphate glass containing BaO, a phosphate glass containing an alkali metal oxide, a phosphate glass containing an alkali metal oxide and an alkaline earth metal oxide, a glass containing $B_2O_3$ and $La_2O_3$, a glass containing $B_2O_3$, $La_2O_3$ and an alkali metal oxide, a glass containing $B_2O_3$, $La_2O_3$ and $WO_3$, a glass containing $B_2O_3$, $La_2O_3$ and $Nb_2O_5$, a glass containing $B_2O_3$, $SiO_2$ and BaO, a glass containing $B_2O_3$ and BaO, a glass containing $B_2O_3$, $SiO_2$, $TiO_2$ and $WO_3$, a glass containing $SiO_2$, an alkali metal oxide and fluorine, a fluorophosphate glass containing an alkali metal oxide and an alkaline earth metal oxide and a fluorophosphate glass containing an alkali metal oxide and ZnO.

According to the above process for producing a glass shaped material, the difference between the mass of an actually produced glass shaped material and the mass of the intended glass shaped material can be within ±1%. There can be also mass-produced glass shaped materials free of defects such as folding bubbles, striae, scratches, devitrification, and the like. For using the glass shaped material as an optical element or a preform for precision press-molding, preferably, the glass shaped material has a smooth surface, and all of the surfaces of the glass shaped material are free surfaces.

When a preform for precision press-molding is produced, a preform obtained from a molten glass by shaping and gradual cooling is washed and dried as required. Further, the preform may be provided with a film having a lubricating activity for mold releasing activity or for easier extension of the glass on the molding surface of a press mold.

The process 1 for producing an optical element will be explained below. The process 1 for producing an optical element, provided by the present invention, comprises the steps of heating a preform made of a glass to soften the preform and precision press-molding the preform, wherein the preform is prepared by the above process for producing a glass shaped material. Examples of the above optical element include a lens, a prism, a lens-attached prism, a diffraction grating and a polygon mirror. Further, examples of the lens include a spherical lens, an aspherical lens, a microlens, a pickup lens and a lens array. That surface of the optical element which refracts light, reflects light, diffracts light or imparts the optical element with an optical function is called an optical-function surface, and press-molding for forming the optical-function surface by press-molding is called precision press-molding. This precision press-molding is also called mold optics shaping.

When a preform having high mass accuracy is used, all of the surfaces of an optical element can be molded (formed) by precision press-molding. When all of the surfaces of the optical element are formed by precision press-molding, it is no longer necessary to apply machining procedures such as grinding, polishing, etc., to a product obtained by the precision press-molding. A non-optical-function surface (circumferential portion of lens) around the optical-function surface may be sometimes used for fixing a lens to a holder. For using the circumferential portion of a lens as a positioning reference when the lens is fixed to a holder, it is essential to form an optical element precisely such that the positions and angles of the optical axis of the lens and the circumferential portion of the lens have predetermined relationships. When the optical-function surface and the circumferential portion of the lens are formed at the same time by precision press-molding, the function of the above positional reference can be provided to the lens simultaneously with the press-molding.

When all the surfaces of an optical element are molded (formed) by precision press-molding, desirably, the mass accuracy of the preform for precision press-molding is adjusted so that it is within ±1% of an intended value.

Embodiments of the precision press-molding will be explained below.

A first embodiment is directed to a method in which a preform is introduced into a press mold, the press mold and the above preform are heated together and the preform is precision-press-molded. In this method, preferably, the temperature of the press mold is adjusted, together with the temperature of the preform, to a temperature at which the glass constituting the preform exhibits a viscosity of $10^8$ to $10^{12}$ dPa·s. Further, preferably, the precision-press-molded product is taken out of the press mold after it is cooled to a temperature at which the above glass exhibits a viscosity of more than $10^{12}$ dPa·s. More preferably, the precision-press-molded product is taken out of the press mold after it is cooled to a temperature at which the above glass exhibits a viscosity of more than $10^{14}$ dPa·s. Still more preferably, the precision-press-molded product is taken out of the press mold after it is cooled to a temperature at which the above glass exhibits a viscosity of more than $10^{16}$ dPa·s.

A second embodiment is directed to a method in which a preform pre-heated to a temperature higher than the temperature of a press mold is introduced into the press mold and the precision-press-molded. In this embodiment, preferably, the precision-press-molded product is taken out of the press mold after the glass constituting the preform (precision-press-molded product) comes to have a viscosity of more than $10^{12}$ dPa·s.

Further, preferably, the preform is pre-heated while it is caused to float, and more preferably, the preform is pre-heated to a temperature at which the above glass exhibits a viscosity of $10^{5.5}$ to $10^9$ dPa·s. Further, preferably, the cooling of the glass is initiated simultaneously with the start of the pressing or somewhere in the course of the pressing.

In the above pre-heating of the preform, preferably, the pre-heating temperature is adjusted to a temperature at which the glass exhibits a viscosity of $10^9$ dPa·s or lower, and more preferably, the pre-heating temperature is adjusted to a temperature at which the glass exhibits a viscosity of $10^{5.5}$ to $10^9$ dPa·s. In addition, the temperature of the press mold is preferably adjusted to a temperature at which the above glass exhibits a viscosity of more than $10^9$ dPa·s but not more than $10^{12}$ dPa·s.

In each of the above first and second embodiments, there can be used a press mold that is made of SiC, a cemented carbide alloy, a refractory metal, or the like and that has a molding surface provided with a release film such as a carbon film, a noble metal film, or the like as required. The press-molding can be carried out in an atmosphere containing nitrogen, a gas mixture of nitrogen and hydrogen, an inert gas, or the like. After gradually cooled, an optical element obtained by the press-molding may be provided with an optical thin film such as an anti-reflection film, or the like as required.

According to the process 1 for producing an optical element, provided by the present invention, the above high-quality preform for precision press-molding is used, so that there can be produced an excellent optical element free of surface and internal defects. Further, the preform has high mass accuracy, so that the optical element can be also produced without applying machining procedures to surfaces other than the optical-function surface(s).

Embodiments of the process 2 for producing a glass shaped material, provided by the present invention, will be explained below.

First, a clarified and homogenized molten glass is prepared, and the molten glass is caused to flow out of a temperature-controlled flow pipe made, for example, of a platinum alloy at a constant flow rate. And, a molten glass drop is caused to drop down on that shaping portion of a shaping mold in a standby position below the flow pipe which is provided with a gas ejection port. A plurality of shaping molds are provided, and when one shaping mold receives a molten glass drop in a molten glass drop receiving position (to be referred to as "drop portion") below the flow pipe, the shaping mold is conveyed out from the drop portion, and an empty shaping mold is conveyed into the drop position. In this manner, a plurality of the shaping molds are consecutively conveyed into the drop position to receive molten glass drops one after another. While each molten glass drop on the shaping mold is caused to float by upward application of air (gas) pressure based on gas (floating gas) ejected upwardly from the gas ejection port, the molten glass drops are shaped into glass shaped materials. Each of the solidified glass shaped materials is taken out of the shaping mold, and the shaping mold is again returned to the drop position.

A plurality of the shaping molds are used while they are circulated as described above. Since, however, the floating gas is ejected from the gas ejection port, the floating gas is blown to the flow pipe when the shaping mold reaches the drop position, so that the flow-out condition and dropping condition are destabilized.

That "the flow-out condition is destabilized" will be specifically explained in meaning. When the floating gas is blown to the forward end of the flow pipe, the forward end of the flow pipe is cooled by the gas, so that the temperature of the flow pipe varies and that the flow rate of the glass. However, the mass of the glass that flows out does not vary to a great extent when the variation width of the flow rate of the glass is small (Reasons therefor will be discussed later). On the other hand, when the temperature of the forward end of the flow pipe is decreased, a crystal of the molten glass may be sometimes precipitated on the flow outlet, and in this case, the glass that is caused to drop increases in mass, or striae take place in a glass shaped material. Glass compositions already described are generally liable to be crystallized in the flow-out temperature range, so that a decrease in the temperature of the forward end of the flow pipe is a crucial problem.

That "the drop condition is destabilized" will be specifically explained below in meaning. The mass of a liquid drop is determined on the basis of the outer diameter (D) of the flow outlet, the surface tension of a glass (γ) and the gravitational acceleration (g) as will be shown by the following expression (1).

$$\text{Mass of Liquid drop} = \pi D \gamma / g \quad (1)$$

Strictly, as the glass flow rate increases, the mass of a liquid drop increases. However, when the change in the flow rate is small, the flow rate does not constitute a variation factor, and the effect thereof is negligible. On the other hand, γ is dependent upon temperatures, and when the change in the temperature is large, therefore, the change causes the mass of a liquid drop to vary. While g is constant on the surface of the earth, when the floating gas hits the forward end of a liquid drop, it works as an elevating force, so that there is produced an effect that g is apparently smaller. That is, when the floating gas hits the liquid drop from below the liquid drop, the mass of the liquid drop increases. However, the flow of the floating gas is disturbed, and the force to elevate the liquid drop is not constant, so that the mass of the liquid drop is more likely to vary than a case when the floating gas is blocked.

In the process 2 of the present invention, a blocker is provided between the flow pipe and the shaping mold to shield the flow pipe from the floating gas ejected from said shaping mold so that the floating gas is not blown to the flow pipe. For performing the above shielding sufficiently, there is employed a constitution in which the blocker is arranged so as to cross the dropping course of the molten glass drop, and the blocker is removed from the dropping course synchronously with the dropping of the molten glass drop. Specifically, the blocker is constituted of a plurality of split members, and the blocker is arranged so that it has a constitution in which the split members are attached tightly to each other to shield the flow pipe from the gas ejected, and the above split members are spaced from each other synchronously with the dropping of the molten glass, to cause a molten glass drop to drop down through between the spaced split members. For reliably and easily performing the above procedures, preferably, the blocker is constituted of two split members.

The flow pipe is shielded from the floating gas as described above, whereby the flow-out condition of the molten glass and the drop condition of the molten glass drop are stabilized, and the glass shaped material can be improved in mass accuracy. The above mass accuracy is desirably within ±1% of an intended mass.

Embodiments of the process 3 for producing a glass shaped material will be explained below. This process is similar to the process 2 for producing a glass shaped material in that it is a process in which a molten glass drop is caused to drop down from a flow pipe and is received with a shaping mold that ejects a gas and the received molten glass drop is shaped into a glass shaped material while it is caused to float. A support is provided so as to cross the dropping course of the molten glass drop, the flow pipe is shielded from the gas ejected from the above shaping mold, the molten glass drop that drops is received directly with the above support, then, the above support is removed to cause the molten glass gob to drop perpendicularly down, and the molten glass gob is received with the shaping mold and shaped into a glass shaped material. The above support performs not only the function of the blocker in the process 2 for producing a glass shaped material but also the function of a support that directly receives the dropped molten glass drop and supports the same.

The viscosity of the molten glass gob increases due to its contact to the split members constituting the above support, so that the glass folding that is liable to take place during the transfer of the molten glass gob to the as shaping mold as will be later can be effectively prevented. It is preferred to cool the split members for preventing the fusion thereof to the molten glass and for making it easier to produce the above effect. Examples of the cooling method includes a method of cooling the split members with water, a method of cooling the split members with air, a method of increasing the emissivity by coloring the split member surfaces in black and a method using a combination of two or more of the above methods. For cooling the split members with water or air, insides of the split members can be provided with flow lines, and cooling water or cooling gas can be allowed to flow through the lines. The material for the molten glass support includes, for example, a refractory metal, carbon and ceramic. When heat resistance and thermal conductivity are taken into account, a refractory stainless steel is preferred.

In the methods 2 and 3 for producing a glass shaped material, the number of the split members constituting the blocker or the support is not critical, and it may be any number. From the viewpoint of reliable and easy operation of the above series of procedures, preferably, the molten glass support is constituted of two split members. In this case, the boundary of the split members in a state where the split members are attached tightly to each other is preferably formed in a straight line for attaching the two members tightly to each other. Desirably, the two split members have flat upper surfaces, the above two upper surfaces form an angle of 90° to 180°, and the two upper surfaces are symmetrical to each other with regard to an imaginary plane passing the boundary of the two split members. The use of the above split members is particularly effective in the process 3 for producing a glass shaped material. Not only the molten glass drop can be stably supported, but the molten glass drop can be caused to drop perpendicularly down upon spacing of the split members.

In the process 2 for producing a glass shaped material, preferably, the molten glass drop is caused to drop down from the flow pipe onto that shaping portion of the shaping mold which is provided with a gas ejection port. In the process 3 for producing a glass shaped material, preferably, the molten glass drop received with the support is caused to drop on that shaping portion of the shaping mold which is provided with a gas ejection port.

Examples of the floating gas include air, an inert gas and a carbon dioxide gas. The glass can be shaped into a sphere form while the glass is caused to float with the floating gas.

The material for the shaping mold for use in the processes 2 and 3 for producing a glass shaped material can be selected from refractory metals such as stainless steel, carbon and ceramic. The molten glass gob transferred to the shaping mold has a lower temperature than the temperature of the glass that has flowed out. However, it still has a high temperature and may be fused to the shaping mold. Preferably, therefore, the shaping mold is temperature-controlled so that it has a temperature of 300° C. or lower, for reliably preventing the fusion. Desirably, further, the surface of the shaping mold is provided with a diamond-like carbon film. Desirably, the above surface is preferably finished so as to be a mirror surface.

For transferring the shaping molds, there may be employed a constitution in which a plurality of the shaping molds are arranged at regular intervals on a turn table and one empty shaping mold stays in a standby (receiving) position when one molten glass drop is caused to drop down. In this manner, the molten glass drop are distributed to a plurality of the shaping molds and shaped into glass shaped materials.

The above processes 2 and 3 are also suitable for shaping a glass whose mass accuracy and quality are liable to vary due to a change in the flow-out condition of the molten glass and the dropping condition of the molten glass drop, and are suitable for a glass having a viscosity of 0.5 to 50 dPa·s when the glass flows down.

Examples of the form of the thus-obtained glass shaped material include the form of a sphere and the form of a body of revolution which has one revolution symmetrical axis and where the outline of a cross section including the above revolution symmetrical axis has an outwardly convex form.

Further, when a glass shaped material made of an optical glass is produced, there can be also prepared a preform for producing a ball lens or an optical element by precision press-molding.

Glass materials suitable for producing the above glass shaped material (Processes 2 and 3 for producing a glass shaped material) will be explained below. While the above processes are suitable for a glass having a viscosity in the range of 0.5 to 50 dPa·s as is explained already, it is essential to adjust the temperature of the molten glass that is flowing down to a temperature higher than the liquidus temperature of thereof, for preventing the devitrification of the glass when it flows out and is shaped into a glass shaped material. When the glass shaped material itself is used as an optical element or when the glass shaped material is used as a preform for precision press-molding to produce an optical element therefrom by precision press-molding, there is demanded a glass material having a constant dispersion and having a higher refractive index than a conventional one. Most of such optical glasses have a viscosity in the range of 0.5 to 50 dPa·s during their flowing time for preventing their devitrification. Examples of such optical glasses include a phosphate glass containing $Nb_2O_5$, a phosphate glass containing $TiO_2$, a phosphate glass containing BaO, a phosphate glass containing $Li_2O$, a phosphate glass containing $Na_2O$, a phosphate glass containing $K_2O$, a glass containing $B_2O_3$ and $La_2O_3$, a glass containing $B_2O_3$, $La_2O_3$ and $WO_3$, a glass containing $B_2O_3$, $SiO_2$ and BaO, a glass containing $B_2O_3$, $SiO_2$, $TiO_2$ and $WO_3$, a glass containing $SiO_2$, an alkali metal oxide and fluorine, a fluorophosphate glass containing an alkali metal oxide and an alkaline earth metal oxide and a fluorophosphate glass containing an alkali metal oxide and ZnO.

When the above glass material having a low viscosity during the time of its flowing down is shaped into a preform for precision press-molding, the following problem is liable to take place. For example, when a spherical preform is produced, a molten glass is inserted into a shaping mold having a funnel-shaped hole that will be shown in FIG. 3 later and shaped into the preform. While the molten glass is inserted, if the molten glass can be inserted into the center of the mold, the molten glass is supported by an upwardly blowing gas flow to reach its stay position, so that the possibility of bubbles or striae being caused by folding of the molten glass is decreased. However, when the molten glass is caused to drop in a state where it hits an entrance or a wall of the funnel-shaped hole, the molten glass is sometimes extended due to a frictional resistance between the wall and the glass or an instantaneous fusion thereof. In this case, the glass is liable to be folded into itself to cause bubbles or striae. Such a problem is a problem characteristic of a glass material having a low viscosity when it flows down, and a glass having a viscosity higher than 50 dPa·s is almost free from such a problem. In the present invention, therefore, the shaping mold is arranged to be positioned right below the flow outlet, so that the occurrence of the folding and bubbles during the insertion of the molten glass into the mold is prevented. However, when the floating gas from the shaping mold hits the flow outlet, there is caused a problem that the mass varies or the glass quality is degraded, so that the present invention has been made. Preferably, the blocker to be used only for shielding the flow outlet from the floating gas from the shaping mold like the process 2 for producing a glass shaped material has the form of as thin plate, so that the dropping distance of the molten glass can be minimized so long as it is possible. The material for the blocker can be selected from refractory metal materials by taking account of a case where the molten glass comes in contact therewith. Further, the shielding and removal are carried out at a high speed synchronously with the dropping of the molten glass drop, so that it is desirable to employ the split members which have a small moving distance therebetween.

The process (process 3) for producing a shaped glass material by supporting a dropping molten glass drop with a support, cooling the molten glass drop to some extent, removing the above support to cause the molten glass drop to drop perpendicularly down on a shaping mold and shaping the molten glass drop into the shaped glass material has the following advantages. When a glass material having an extremely low viscosity during the time of its flowing down is inserted directly into the shaping mold that is ejecting a gas, folding, striae or bubbles may sometimes take place even if it is inserted into the center of the mold. Particularly, when a preform having the form of a sphere is produced, it is required to turn the molten glass in the shaping mold at a high speed, so that folding, striae or bubbles may sometimes take place. Before the form of a sphere is formed in the shaping mold, it is important to increase the viscosity of the molten glass even to a little extent. In the present invention, the molten glass is supported on the support before it is inserted into the shaping mold, so that heat is removed from the molten glass through a contact surface to cool the molten glass. There may be other cooling means. In a method of blowing a gas, however, the flow outlet may be possibly cooled. It is thinkable to employ a method in which a support made of a porous material is provided and a molten glass is supported and cooled in a non-contact state, with a gas that is blown out from the porous material. However, the flow outlet may be possibly cooled with the gas. Further, since the cooling rate in a non-contact state is small, it is required to increase intervals between dropping and dropping of the molten glass, which causes a problem that the productivity is decreased. That is, for reasons that the viscosity of the molten glass is increased for a short period of time and that there is no possibility of the flow outlet being cooled, the process of the present invention is suitable. When the molten glass is caused to drop down and inserted into the shaping mold as described above, desirably, the molten glass is caused to drop toward the center of the mold at a speed that is as low as possible, i.e., in free fall. For achieving the above conditions, the present invention employs a method in which the support is constituted of a plurality of split members, the split members are attached tightly to each other to receive a molten glass, and the split members are spaced from each other to cause the molten glass drop to draw down through between the spaced split members. In this method, the dropping distance of the liquid drop can be decreased, and a molten glass can be caused to drop in free fall. Further, by the means mentioned below, the molten glass can be caused to drop perpendicularly down in free fall without causing an impact on the molten glass.

The split members are constituted of a metal material, carbon or ceramic having heat resistance, and each of the split members is formed in the form of a thin plate. A contact portion which comes in contact with the molten glass is cooled by flowing water or gas inside thereof, so that the fusion thereof to the glass is prevented. Further, for stabilizing the position of a molten glass gob that is caused to drop down, the split members are inclined toward a tightly contact portion thereof, and the level of the position for supporting the molten glass is lowered. The surface is not necessarily required to be flat, and it may be a curved surface. Further, a dent may be formed in the portion which comes in contact with the molten glass.

For decreasing the force that is exerted on the molten glass in the horizontal direction when the split members are spaced from each other, desirably, the surfaces for supporting the molten glass are polished surfaces, and each surface is provided with a coating having fusion-prevention and low-friction properties.

According to the above processes 2 and 3 for producing a glass shaped material, the difference between the mass of actually produced glass shaped material and the mass of an intended glass shaped material can be within ±1%. Further, when the glass shaped material is a glass having a small volume of 400 mg or less, the above difference can be within ±0.3 to 0.5%. Glass shaped materials free of striae, scratches and devitrification can be also mass-produced. For using the glass shaped material as an optical element or a preform for precision press-molding, preferably, the glass shaped material has a smooth surface, and all of the surfaces of the glass shaped material are formed of free surfaces.

When a preform for precision press-molding is produced, a preform shaped from a molten glass and gradually cooled is washed and dried as required. Further, the preform may be provided with a film having mold release activity or lubrication activity that makes the glass easily extendable on the surface of a press mold.

The process 2 for producing an optical element will be explained below. The process 2 for producing an optical element, provided by the present invention, is a process for producing an optical element comprising the steps of heating a preform made of a glass to soften the preform and precision-press-molding the preform, wherein the preform is prepared by the above process 2 or 3 for producing a glass shaped material. Examples of the above optical element include a lens, a prism, a prism with a lens, a diffraction grating and a polygon mirror. Further, examples of the lens include a spherical lens, an aspherical lens, a microlens, a pickup lens and a lens array.

When a preform having high mass accuracy is used, all of the surfaces of an optical element can be formed by precision press-molding. When all of the surfaces of an optical element are formed by precision press-molding, it is no longer necessary to apply machining procedures such as grinding and polishing to a product obtained by the precision press-molding. A non-optical-function surface (to be referred to as "circumferential portion of lens") around the optical-function surface may be sometimes used for fixing a lens to a holder. For using the circumferential portion of a lens as a positioning reference when the lens is fixed to a holder, it is essential to form an optical element precisely such that the relative positions and angles of the optical axis of the lens and the circumferential portion of the lens have predetermined relationships. When the optical-function surface and the circumferential portion of the lens are formed at the same time by precision press-molding, the function of the above positional reference can be provided to the lens simultaneously with the press-molding.

When all of the surfaces of an optical element is formed (molded) by precision press-molding, desirably, the mass accuracy of a preform for the precision press-molding is within ±1% of an intended value.

Embodiments of the precision press-molding are as explained already with respect to the process 1 for producing an optical element.

According to the process 2 for producing an optical element, provided by the present invention, a high-quality preform for precision press-molding is used as described above, so that there can be produced an optical element free of surface defects and internal defects. Further, the preform has high mass accuracy, so that an optical element can be produced as well without applying machining procedures to any surfaces other than optical-function surface.

According to the process for producing a glass shaped material, glass shaped materials having high quality and high mass accuracy can be produced.

According to the process for producing a glass shaped material, there can be provided a process for producing an optical element that has high quality and that requires no grinding or polishing procedure or can minimize the grinding and polishing procedures.

The present invention will be explained in detail with reference to Examples hereinafter, while the present invention shall not be limited by these Examples.

Example 1

A glass raw material prepared to give desired optical properties finally with respect to a refractive index, dispersion, transmittance, etc., is melted under heat, defoamed, clarified and homogenized by stirring, to obtain a molten glass, and the molten glass is caused to flow down from a temperature-controlled nozzle made of a platinum alloy at a constant rate. In this case, the take-up amount of the glass was set at 10 kg/day, and the flow-out rate was set at 2.5 mm/second.

The molten glass flow that is flowing down is shaped into preforms for press-molding according to a production process chart shown in FIG. 1.

A molten glass support used in this Example was constituted of two split members having the form of a flat plate each, and the surfaces for receiving a forward end of the molten glass flow were finished to have mirror surfaces. The molten glass support had a constitution in which the above split members formed one flat surface in a state where they were tightly attached to each other. Inside the molten glass support, water lines for preventing the fusion to a molten glass were provided, and cooling water was allowed to flow for water-cooling. Further, a diamond-like carbon was coated on the surface of the molten glass support.

First, the molten glass support was moved upwardly in a state where the split members were tightly in contact with each other, and the molten glass support was moved until the surface for receiving a forward end of a molten glass flow came to a position 4 mm below the flow outlet of a flow pipe. Then, the molten glass support was stopped. In this state, the surface for receiving a forward end of a molten glass flow was maintained in a horizontal state (in a state where the above receiving surface faced perpendicularly upwardly relative to a molten glass flow). Then, a forward end of a flowing molten glass flow was received and supported with a boundary portion of the two split members that were tightly attached to each other. With the passage of time, the molten glass supported on the molten glass support grows in size, so that the wetting up of the molten glass on the circumference of forward end of the pipe may be prevented by moving the above support perpendicularly down at a low rate of 0.5 mm/second.

After the molten glass in an amount that as to give an intended mass of a molten glass gob stayed on the above support, the above support was caused to rapidly move perpendicularly down at a rate of 10 mm/second, which was faster than the flow-out rate of the molten glass flow, in a state where the split members were tightly attached to each other, to separate the forward end side of the molten glass from the narrow portion caused in the molten glass flow due to the surface tension of the glass, whereby a molten glass gob having a predetermined mass was obtained on the above support. Then, the split members were spaced from each other, to cause the molten glass gob to drop perpendicularly down through between the two split members. The dropping molten glass gob dropped toward a shaping mold waiting below the above support, and the molten glass gob was shaped into a glass shaped material while it was floated with a gas (nitrogen gas) ejected from the bottom of the shaping mold. Immediately after the molten glass gob was caused to drop down from the molten glass support, the split members were restored to a state where they were attached tightly to each other. In the above procedure, the above support blocked the gas, and it was possible to prevent the blowing of the gas to the flow pipe. And, the above support was again moved upward to receive a forward end of the molten glass flow.

The glass shaped material cooled and solidified on the shaping mold with the passage of time was taken out of the shaping mold by suction, transferred onto a pallet and gradually cooled. In this manner, glass shaped materials having a predetermined mass each were produced from the continuously flowing molten glass one after another. Spherical glass shaped materials having a weight of 350±3 mg, made of an optical glass, were produced in the above manner at a cutting time of 3.0 seconds, and they were used as preforms for precision press-molding.

No defect such as a crack, other damage, folding, devitrification, or the like, was observed in the preforms for precision press-molding. Further, since the glass flow was cut with one and the same molten glass support constituted of the split members, the cutting accuracy of the glass flow was remarkably improved over a case where the glass flow was cut with a plurality of shaping molds, and there was no case where the temperature of the forward end of the flow pipe varied due to the gas blown thereto from the shaping molds, so that the mass accuracy was high or within ±1% of an intended value as described above.

As a glass in this Example, there were used phosphate glasses 1 to 3, glasses 1 to 3 containing $B_2O_3$ and $La_2O_3$, a glass containing $SiO_2$, an alkali metal oxide and fluorine, a fluorophosphate glass containing an alkali metal oxide and an alkaline earth metal oxide, a glass containing $B_2O_3$, $SiO_2$ and BaO and a glass containing $B_2O_3$, $SiO_2$, $TiO_2$ and $WO_3$, as shown in Table 1.

TABLE 1

| Name in this Example | Glass components |
| --- | --- |
| Phosphate glass 1 | $P_2O_5$, $B_2O_3$, $Li_2O$, $Na_2O$, $Al_2O_3$, ZnO, $TiO_2$, $Nb_2O_5$, $WO_3$ |
| Phosphate glass 2 | $P_2O_5$, $B_2O_3$, $Li_2O$, $Na_2O$, $K_2O$, BaO, ZnO, $TiO_2$, $Nb_2O_5$, $WO_3$ |
| Phosphate glass 3 | $P_2O_5$, $B_2O_3$, $Li_2O$, $Na_2O$, $K_2O$, CaO, BaO, ZnO |
| Glass 1 containing $B_2O_3$ and $La_2O_3$ | $B_2O_3$, $SiO_2$, $La_2O_3$, $Gd_2O_3$, ZnO, $ZrO_2$, $Ta_2O_5$, $Li_2O$ |
| Glass 2 containing $B_2O_3$ and $La_2O_3$ | $B_2O_3$, $La_2O_3$, $Gd_2O_3$, ZnO, $ZrO_2$, $Ta_2O_5$, $Li_2O$, $WO_3$, $(Y_2O_3)$, $(Nb_2O_5)$ |
| Glass 3 containing $B_2O_3$ and $La_2O_3$ | $B_2O_3$, $SiO_2$, $La_2O_3$, $Gd_2O_3$, ZnO, $ZrO_2$, $Ta_2O_5$, $Li_2O$, $WO_3$, $(Y_2O_3)$, $(Nb_2O_5)$ |
| Glass containing $SiO_2$, alkali metal oxide and fluorine | $SiO_2$, $R_2O$ (R represents at least one or a plurality of alkali metal elements selected from Li, Na or K), F, others |
| Fluorophosphate glass containing alkali metal oxide and alkaline earth metal oxide | $R_2O$ (R represents at least one or a plurality of alkali metal elements selected from Li, Na or K), R'O (R' is at least one or a plurality of alkaline earth metal elements selected from Mg, Ca, Sr Or Ba), F, $P_2O_5$, others |
| Phosphate glass containing alkali metal oxide and ZnO | $R_2O$ (R represents at least one or a plurality of alkali metal elements selected from Li, Na or K), ZnO, F, $P_2O_5$, others |
| Glass containing $B_2O_3$, $SiO_2$ and BaO | $B_2O_3$, $SiO_2$, BaO, ZnO, $Li_2O$, $Na_2O$, $K_2O$, CaO, SrO, MgO, $La_2O_3$, $ZrO_2$, others |
| Glass containing $B_2O_3$, $SiO_2$, $TiO_2$ and $WO_3$ | $B_2O_3$, $SiO_2$, $TiO_2$, ZnO, $Li_2O$, CaO, MgO, $Nb_2O_5$, $Ta_2O_5$, $WO_3$, $La_2O_3$, $Gd_2O_3$, others |

$(Y_2O_3)$ and $(Nb_2O_5)$ in the column of Glass components in Table 1 represent a case where $Y_2O_3$ and $Nb_2O_5$ were contained as glass components, a case where $Y_2O_3$ was contained but $Nb_2O_5$ was not contained, a case where $Y_2O_3$ was not contained but $Nb_2O_5$ was contained or a case where none of $Y_2O_3$ and $Nb_2O_5$ was contained.

In any glass, the above excellent results were obtained.

Example 2

Figure 2:
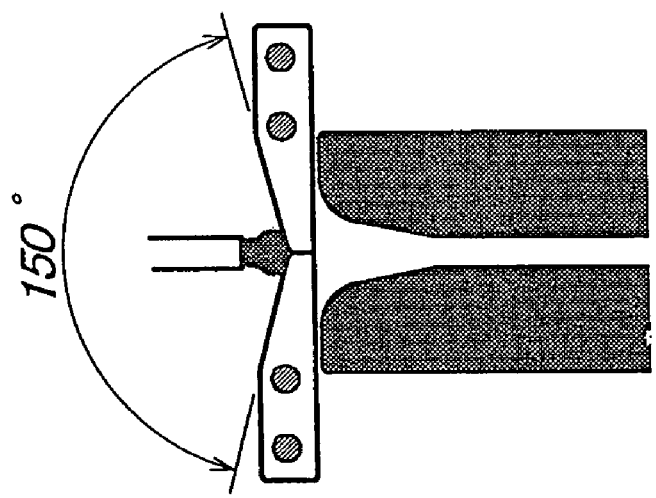
FIG. 2 shows a drawing for explaining the form of split members for receiving a molten glass flow, which were used in Example 2.

Split members for receiving a molten glass flow, having a form shown in FIG. 2, was used, and Example 1 was repeated. The split members were tapered as shown in FIG. 2, and they had an open angle of 150° in a state where they were attached tightly to each other. The position where the molten glass was received was further stabilized due to the above tapering, and the accuracy of the position where a molten glass gob was to drop was improved.

Example 2 used the same glasses as those used in Example 1.

Example 3

The preforms produced in Examples 1 and 2 were washed and dried, and then they were precision-press-molded to obtain aspherical lenses. The above precision press-molding used a press mold that was made of SiC and had a surface on which a carbon film was formed, and a nitrogen atmosphere was employed as an atmosphere. In the precision press-molding, each preform was heated up to 635° C. and pressed under a pressure of 9.8 MPa for 60 seconds. After the press-molding, each spherical lens was taken out of the press mold and gradually cooled. Both the inside and the surface of each of the thus-obtained lenses were in an excellent state. These lenses required no centering procedure, and that circumferential portion of each lens which was formed by the precision press-molding could be used as a positioning reference for fixing the lens to a holder. An anti-reflection film may be formed on the thus-formed surface.

In the above precision press-molding, there may be employed a constitution in which a preform is introduced into a press mold and the preform and the press mold are heated together or a constitution in which a heated preform is introduced into a pre-heated press mold and pressed.

While this Example is concerned with a process for producing an aspherical lens, this Example can be also applied to the production of other optical element such as a prism, a diffraction grating, or the like.

Example 4

A glass raw material prepared to give desired optical properties finally with respect to a refractive index, dispersion, transmittance, etc., is melted under heat, defoamed, clarified and homogenized by stirring, to obtain a molten glass, and the molten glass is caused to flow down from a temperature-controlled nozzle made of a platinum alloy at a constant rate. In this case, the take-up amount of the glass was set at 12 kg/day.

Figure 3:
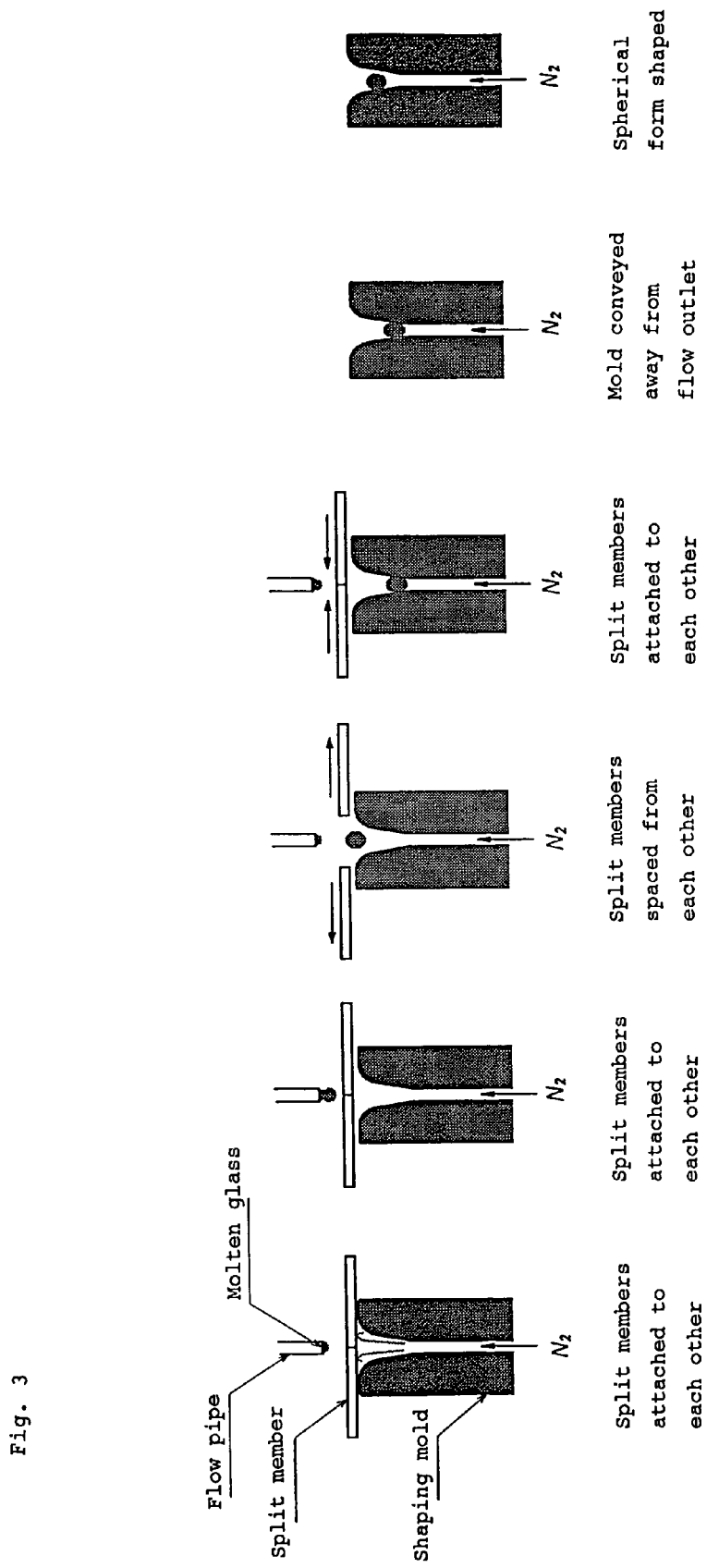
FIG. 3 shows drawings for explaining the steps of producing preforms for precision press-molding in Example 3.

A molten glass drop dropping from the forward end of a flow pipe is shaped into a preform for precision press-molding according to a production flow chart shown in FIG. 3.

This Example used a blocker constituted of two split members having the form of a flat plate each. The above split members are attached tightly to each other to shield the forward end of a flow pipe from a gas or air coming from below. The split members are spaced from each other synchronously with the timing of dropping of each molten glass drop, to cause each molten glass drop to fall down toward a shaping mold through between the spaced split members. Immediately after the molten glass drop passes through between the split members, the split members are attached tightly to each other to shield the flow pipe from the gas.

The molten glass drop dropped on the shaping mold is shaped into a spherical glass shaped material in a state where it is caused to float whirling due to a floating gas. Then, the cooled and solidified glass shaped material is taken out of the shaping mold by suction, transferred onto a pallet and gradually cooled. In this manner, a molten glass that continuously flows down is caused to drop one drop after another, and glass shaped materials are produced one after another.

In the above manner, spherical glass shaped materials made of optical glasses having a weight of 350±1.4 mg were produced and used as preforms for precision press-molding.

No defect such as a crack, other damage, striae, devitrification, or the like, was observed in the preforms for precision press-molding. Further, the mass accuracy thereof was high or within ±1% of an intended value as described above.

Example 5

Figure 4:
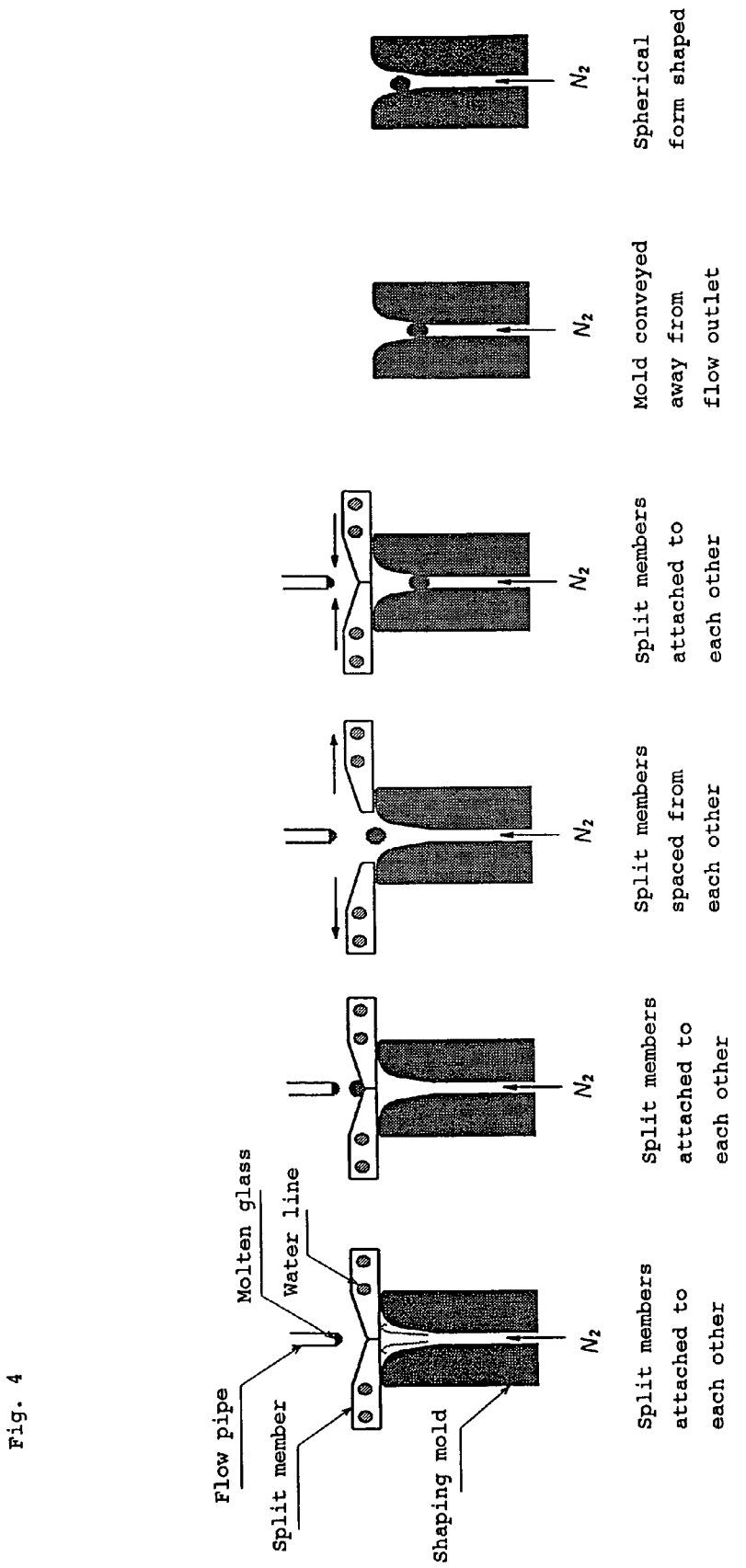
FIG. 4 shows drawings for explaining the steps of producing preforms for precision press-molding in Example 5.

Then, a molten glass drop that is dropping from the forward end of the flow pipe is shaped into a preform for precision press-molding according to a production flow chart shown in FIG. 4. This process corresponds to the process 3 for producing a glass shaped material.

This Example used a support constituted of two split members having the form of a flat plate each. The above split members are attached tightly to each other to shield the forward end of a flow pipe from the upward current of a gas or air. After a molten glass drop drops on the support from the forward end of the flow pipe, the glass droplet is cooled to some extent, and then the split members are spaced from each other to cause the glass droplet to fall into a shaping mold through between the spaced split members. Immediately after the molten glass drop passes through between the split members, the split members are attached tightly to each other to shield the flow pipe from the gas.

The molten glass drop dropped on the shaping mold is shaped into a spherical glass shaped material in a state where it is caused to float whirling due to a floating gas. Then, the cooled and solidified glass shaped material is taken out of the shaping mold by suction, transferred onto a pallet and gradually cooled. In this manner, a molten glass that continuously flows down is caused to drop one drop after another, and glass shaped materials are produced one after another.

In the above manner, spherical glass shaped materials made of optical glasses having a weight of 350±1.4 mg were produced and used as preforms for precision press-molding.

No defect such as a crack, other damage, striae, devitrification, or the like, was observed in the preforms for precision press-molding. Further, the mass accuracy thereof was high or within ±1% of an intended value as described above.

Examples 4 and 5 used phosphate glasses 1 to 3, glasses 1 to 3 containing $B_2O_3$ and $La_2O_3$, a glass containing $SiO_2$, an alkali metal oxide and fluorine, a fluorophosphate glass containing an alkali metal oxide and an alkaline earth metal oxide, a glass containing $B_2O_3$, $SiO_2$ and BaO and a glass containing $B_2O_3$, $SiO_2$, $TiO_2$ and $WO_3$, as shown in Table 2.

TABLE 2

| Name in this Example | Glass components |
| --- | --- |
| Phosphate glass 1 | $P_2O_5$, $B_2O_3$, $Li_2O$, $Na_2O$, $Al_2O_3$, ZnO, $TiO_2$, $Nb_2O_5$, $WO_3$ |
| Phosphate glass 2 | $P_2O_5$, $B_2O_3$, $Li_2O$, $Na_2O$, $K_2O$, BaO, ZnO $TiO_2$, $Nb_2O_5$, $WO_3$ |
| Phosphate glass 3 | $P_2O_5$, $B_2O_3$, $Li_2O$, $Na_2O$, $K_2O$, CaO, BaO, ZnO |
| Glass 1 containing $B_2O_3$ and $La_2O_3$ | $B_2O_3$, $SiO_2$, $La_2O_3$, $Gd_2O_3$, ZnO, $ZrO_2$, $Ta_2O_5$, $Li_2O$ |
| Glass 2 containing $B_2O_3$ and $La_2O_3$ | $B_2O_3$, $La_2O_3$, $Gd_2O_3$, ZnO, $ZrO_2$, $Ta_2O_5$, $Li_2O$, $WO_3$, ($Y_2O_3$), ($Nb_2O_5$) |
| Glass 3 containing $B_2O_3$ and $La_2O_3$ | $B_2O_3$, $SiO_2$, $La_2O_3$, $Gd_2O_3$, ZnO, $ZrO_2$, $Ta_2O_5$, $Li_2O$, $WO_3$, ($Y_2O_3$), ($Nb_2O_5$) |
| Glass containing $SiO_2$, alkali metal oxide and fluorine | $SiO_2$, $R_2O$ (R is at least one or plurality of alkali metal elements selected from Li, Na or K), F, others |
| Fluorophosphate glass containing alkali metal oxide and alkaline earth metal oxide | $R_2O$ (R is at least one or a plurality of alkali metal elements selected from Li, Na or K), R'O (R' is at least one or a plurality of alkaline earth metal elements selected from Mg, Ca, Sr Or Ba), F, $P_2O_5$, Others |
| Fluorophosphate glass containing alkali metal oxide and ZnO | $R_2O$ (R represents at least one or a plurality of alkali metal elements selected from Li, Na or K), ZnO, F, $P_2O_5$, others |
| Glass containing $B_2O_3$, $SiO_2$ and BaO | $B_2O_3$, $SiO_2$, BaO, ZnO, $Li_2O$, $Na_2O$, $K_2O$, CaO, SrO, MgO, $La_2O_3$, $ZrO_2$, Others |
| Glass containing $B_2O_3$, $SiO_2$, $TiO_2$ and $WO_3$ | $B_2O_3$, $SiO_2$, $TiO_2$, ZnO, $Li_2O$, CaO, MgO, $Nb_2O_5$, $Ta_2O_5$, $WO_3$, $La_2O_3$, $Gd_2O_3$, others |

($Y_2O_3$) and ($Nb_2O_5$) in the column of Glass components in Table 2 represent a case where $Y_2O_3$ and $Nb_2O_5$ were contained as glass components, a case where $Y_2O_3$ was contained but $Nb_2O_5$ was not contained, a case where $Y_2O_3$ was not contained but $Nb_2O_5$ was contained or a case where none of $Y_2O_3$ and $Nb_2O_5$ was contained.

In any glass, the above excellent results were obtained.

Example 6

The preforms produced in Examples 4 and 5 were washed and dried, and then they were precision-press-molded to produce aspherical lenses. The above precision press-molding used a press mold that was made of SiC and had a surface on which a carbon film was formed, and a nitrogen atmosphere was employed as an atmosphere. In the precision press-molding, each preform was heated up to 635° C. and pressed under a pressure of 9.8 MPa for 60 seconds. After the press-molding, each spherical lens was taken out of the press mold and gradually cooled. Both the inside and the surface of each of the thus-obtained lenses were in an excellent state. These lenses required no centering procedure, and that circumferential portion of each lens which was formed by the precision press-molding could be used as a positioning reference for fixing the lens to a holder. An anti-reflection film may be formed on the thus-formed surface.

In the above precision press-molding, further, there may be employed a constitution in which a preform is introduced into a press mold and the preform and the press mold are heated together or a constitution in which a heated preform is introduced into a pre-heated press mold and pressed.

While this Example is concerned with a process for producing an aspherical lens, this Example can be also applied to the production of other optical element such as a prism, a diffraction grating, or the like.

The invention claimed is:

1. A process for producing glass shaped materials by separating a predetermined amount each of a molten glass gob from forward ends of a molten glass flow flowing downwardly from a flow pipe and shaping the molten glass gobs into the glass shaped materials, the process comprising receiving the forward end of a molten glass flow with a molten glass support arranged below the flow pipe to support the forward end directly, causing said molten glass support to move perpendicularly down to separate a predetermined amount of a molten glass gob from the forward end of the molten glass flow, receiving the molten glass gob that is caused to drop perpendicularly down by removing said support, with a shaping mold, shaping the molten glass gob into the glass shaped material and repeating these procedures, the molten glass support being one and the same support.

2. The process for producing glass shaped materials as recited in claim 1, wherein said molten glass gob is separated at a constant time interval from the molten glass flow continuously flowing downwardly at a constant flow rate with the molten glass support, and thus-separated molten glass gobs are consecutively distributed to a plurality of shaping molds.

3. The process for producing glass shaped materials as recited in claim 1, wherein the molten glass support is constituted of a plurality of split members that can be spaced from, and attached tightly to, each other, the forward end of the molten glass flow is received with a boundary portion formed by tight attachment of said split members in a state where said split members are tightly attached to each other, to support the forward end, and said split members are spaced from each other to cause the molten glass gob to drop perpendicularly down.

4. The process for producing glass shaped materials as recited in claim 3, wherein immediately after the glass gob is caused to drop perpendicularly down, the split members are attached tightly to each other, and the molten glass gob is shaped into the glass shaped material while gas pressure is applied to the molten glass gob on the shaping mold.

5. The process for producing glass shaped materials as recited in claim 1, wherein the molten glass gob is caused to drop down on the center of the shaping mold.

6. The process for producing glass shaped materials as recited in claim 1, wherein the molten glass gob is separated, and the glass shaped material is shaped, while the molten glass support is cooled.

7. The process for producing glass shaped materials as recited in claim 1, wherein the molten glass flow has a viscosity of 0.5 to 50 dPa·s and is caused to flow downward.

8. The process for producing glass shaped materials as recited in claim 1, wherein the process uses one of a phosphate glass containing $Nb_2O_5$, a phosphate glass containing $TiO_2$, a phosphate glass containing BaO, a phosphate glass containing $Li_2O$, a phosphate glass containing $Na_2O$, a phosphate glass containing $K_2O$, a glass containing $B_2O_3$ and $La_2O_3$, a glass containing $B_2O_3$, $La_2O_3$ and $WO_3$, a glass containing $B_2O_3$, $SiO_2$ and BaO, a glass containing $B_2O_3$, $SiO_2$, $TiO_2$ and $WO_3$, a glass containing $SiO_2$, an alkali metal oxide and fluorine, a fluorophosphate glass containing an alkali metal oxide and an alkaline earth metal oxide and a fluorophosphate glass containing an alkali metal oxide and ZnO.

9. The process for producing glass shaped materials as recited claim 1, wherein the glass shaped material is a preform for precision press-molding.

10. A process for producing an optical element comprising the steps of heating a preform made of a glass to soften the preform and precision press-molding the preform, wherein the preform is prepared by the process recited in claim 9.

11. The process for producing an optical element as recited in claim 10, wherein all of surfaces of the optical element are formed by precision press-molding.

12. The process for producing an optical element as recited in claim 10, wherein the preform is introduced into a press mold, the press mold and said preform are together heated and the preform is precision-press-molded.

13. The process for producing an optical element as recited in claim 10, wherein the preform is pre-heated to a temperature higher than the temperature of the press mold and introduced into the press mold to carry out the precision press-molding.

14. A process for producing glass shaped materials, which comprises causing a molten glass drop to drop down from a flow pipe, receiving the molten glass drop with a shaping mold which is ejecting a gas, and shaping the molten glass drop into the glass shaped material while the molten glass drop is caused to float, wherein a support is provided so as to cross the dropping course of the molten glass drop for shielding the flow pipe from the gas ejected from said shaping mold, the molten glass drop that is caused to drop down is received directly with the support, and then the molten glass gob that is caused to drop perpendicularly down by removing said support is received with a shaping mold, shaping the molten glass gob into the glass shaped material and repeating these procedures, the molten glass support being one and the same support.

15. The process for producing glass shaped materials as recited in claim 14, wherein the support is constituted of a plurality of split members, and said split members are arranged in a manner in which they are attached tightly to each other to shield the flow pipe from the gas ejected, the molten glass drop caused to drop down is received directly on a position formed by tight attachment of said split members, and then, they are spaced from each other to cause the molten glass drop to drop through between the spaced split members.

* * * * *